June 5, 1956   D. E. GRISWOLD   2,749,080
SURGE PRESSURE CONTROL MEANS
Filed April 20, 1953

INVENTOR.
David E. Griswold
BY Bacon + Thomas
ATTORNEYS

//  
Patented June 5, 1956

2,749,080
SURGE PRESSURE CONTROL MEANS
David E. Griswold, San Marino, Calif., assignor to Donald G. Griswold, Alhambra, Calif.

Application April 20, 1953, Serial No. 349,789

6 Claims. (Cl. 251—28)

The present invention relates to automatic means for controlling surge pressure developed in a pipeline as the result of partial or complete closing of a main valve connected in said pipeline, and which means will prevent the surge pressure from exceeding a predetermined value even though this may necessitate reopening of the main valve, or further opening of the main valve, if said main valve is closed or only partially closed at the time that the control means goes into operation.

It is well understood that, as the result of closing a valve in a pipeline and the consequent stopping of the flow of liquid in the pipeline, a surge pressure will be created of a magnitude depending upon the velocity and the mass of the liquid handled, and the length of time expended in closing the valve. It has been the common practice, therefore, to attempt to control the surge pressure by controlling the time interval or the rate at which the valve closes, and one example of means for so controlling a valve is disclosed in Griswold Patent 2,495,324. However, the control of the closing speed of a valve does not directly control or limit the maximum surge pressure that may be created in the pipeline, even though the rate at which the valve closes is controlled, since the demand, velocity, and pressure at the time of closing of the valve will vary from one occasion to another. Hence, it is highly desirable, in many installations, to provide means that will positively prevent the surge pressure from exceeding a given maximum, regardless of the rate at which the main valve is closing.

The surge pressure control means of the present invention is applicable to all fluid pressure operable main valves irrespective of whether the main valve is provided with means for controlling the rate of supply of operating fluid to the pressure chamber of the main valve to control the rate of closing of the main valve. For example, the operating fluid for the main valve may be controlled by a pilot valve of any suitable or conventional type having any desirable flow restricting means associated therewith. Moreover, the pilot valve may be manually operable, fluid pressure responsive, solenoid operated, etc. The surge pressure is controlled independently of such pilot valve and/or flow restricting means, in accordance with the present invention, by an automatic pressure-responsive valve operable by the pressure on the upstream side of the main valve and arranged so that it will bleed operating fluid from the pressure chamber of the main valve whenever the upstream pressure exceeds the set pressure of the control valve, so that the main valve will either be limited in its closing movement, or be caused to reopen in order to prevent an excessive surge pressure from being produced in the pipeline, independently of the control sought to be exercised by the pilot valve, etc.

Accordingly, the principal object of the invention is to provide automatic control means for a main valve connected in a pipeline, that will prevent the main valve from completely closing under conditions that would produce a surge pressure on the upstream side of the main valve in excess of a predetermined value.

Another object is to provide surge pressure control means for a pilot valve controlled main valve that will exert closing control over said main valve independently of the pilot valve.

Another object is to provide surge pressure control means that can be satisfactorily used in combination with various valve closing speed control means, including the means disclosed in the Griswold patent, supra.

Other objects and features of the invention will be apparent from the following description, taken in conjunction with the accompanying drawings, in which.

Figure 1:
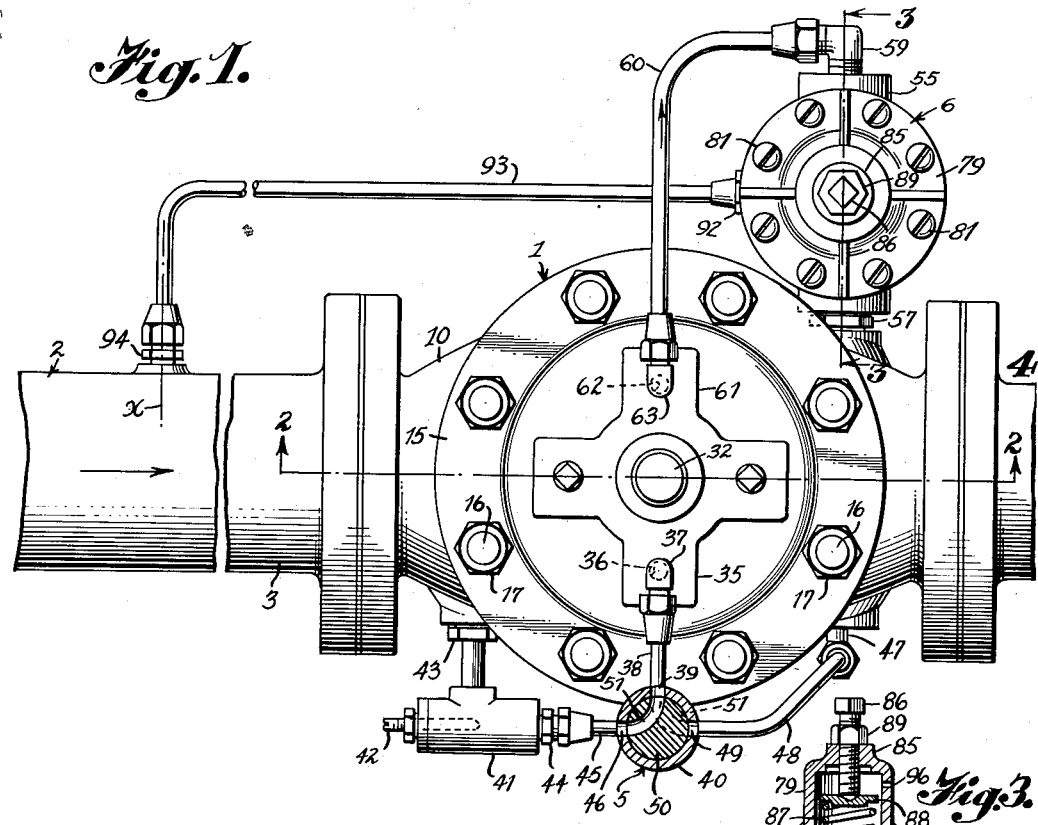
Fig. 1 is a partially diagrammatic plan view of a pipeline including a pilot valve controlled main valve having the automatic surge pressure control means of the present invention association therewith.

Referring now to Fig. 1, the numeral 1 generally identifies a fluid pressure operated main valve connected in a pipeline 2. The pipeline 2 comprises a pipe section 3 connected to the valve 1 on the inlet or upstream side thereof and a pipe section 4 connected to said valve on the outlet or downstream side thereof. The main valve 1 is adapted to be controlled by any suitable or conventional pilot valve 5, which has been diagrammatically illustrated to simplify the disclosure. The pilot valve 5 is adapted to control the supply and exhaust of operating fluid to the main valve 1 in a conventional manner, as will be explained hereinafter. An automatic pressure-responsive control valve 6 is associated with the pipeline 2 and connected with the main valve 1 in such manner as to positively limit the maximum surge pressure that can be produced in the pipeline 2 during the closing of the main valve 1, as will be apparent later.

Figures 2, 3:
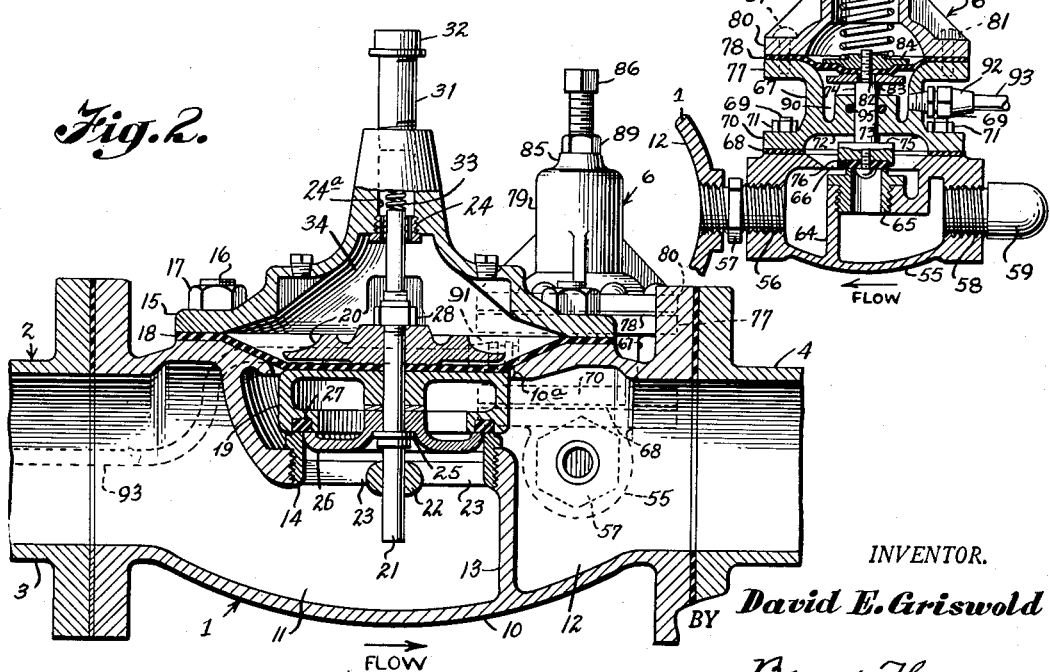
Fig. 2 is a vertical sectional view through the main valve taken on the line 2—2 of Fig. 1.
Fig. 3 is a vertical sectional view taken on the line 3—3 of Fig. 1 through the automatic pressure-responsive control valve.

Referreing now to Fig. 2, the main valve 1 comprises a body 10 provided with an inlet chamber 11 and an outlet chamber 12. A partition 13 in the valve body 10 separates the chambers 11 and 12 and serves as a support for an annular valve seat 14. A cover 15 is secured to the valve body 10 by a plurality of studs 16 and nuts 17, a conventional flexible diaphragm 18 being disposed between the valve body 10 and cover 15.

A diaphragm-supporting plate 19 is disposed in a central opening 10$^a$ in the body 10 below the diaphragm 18 and another supporting plate 20 is disposed in the cover 15 above said diaphragm. A valve stem 21 extends through the diaphragm 18 and its supporting plates 19 and 20 and is slidably mounted at its lower end in a guide 22 supported by arms 23 connected with the seat 14. The upper end of the valve stem 21 is guided in a bushing 24 mounted in a central passageway 24$^a$ in the cover 15. The stem 21 has a shoulder 25 disposed above the guide 22, which serves as an abutment for a disc 26. The supporting plate 19 has an annular groove formed in the lower face thereof in which a sealing ring 27 is disposed and held in place by the outer marginal portion of the disc 26. The stem 21 is threaded in the region of the plate 20 and a self-locking nut 28 is threaded thereon to secure the diaphragm 18, supporting plates 19 and 20, disc 26 and sealing ring 27 in assembled relation. The sealing ring 27 is cooperable with the seat 14 to control the flow of fluid through the main valve 1.

The central passage 24$^a$ is threaded at its outer end and one end of the pipe nipple 31 is mounted therein. The other end of the pipe nipple 31 is closed by a pipe cap 32. A compression spring 33 is disposed within the pipe nipple 31 and its lower end is engaged with the upper end of the valve stem 21 and tends to close the main valve 1 against line pressure. The cover 15 has a cavity that cooperates with the diaphragm 18 to provide a pressure chamber 34 for operating fluid to effect downward flexing the diaphragm 18 to move the valve stem 21 toward valve closing position.

The cover 15 has a laterally extending boss 35 provided with a threaded opening 36 in which a conventional fitting 37 is mounted. One end of a conduit 38 is connected to the fitting 37 and its other end is connected with a port 39 in a casing 40 comprising an element of the pilot valve 5, as diagrammatically illustrated in Fig 1. A housing 41 containing a conventional needle valve 42 has an inlet connected by pipe fittings 43 to the inlet chamber 11 of the main valve 1. A conventional fitting 44 is connected with an outlet of the needle valve housing 41 and connects one end of a conduit 45 to said housing. The opposite end of the conduit 45 is connected with a port 46 in the casing 40. Another conventional fitting 47 is mounted on the valve body 10 and communicates with the outlet chamber 12 of the main valve 1. The fitting 47 connects one end of a conduit 48 to the main valve 1 and its opposite end is connected with the casing 40 and communicates with a port 49 in said casing.

The pilot valve 5 includes a rotor 50 having a port 51 adapted to be positioned to selectively establish communication between the ports 46 and 39, or between the ports 39 and 49. The port 51 is illustrated in Fig. 1 interconnecting the former ports so that operating fluid can flow from the inlet chamber 11 of the main valve through the pipe fittings 43, the housing 41 of the needle valve, conduit 45, ports 46, 51 and 39, conduit 38 and fitting 37, into the pressure chamber 34 of the main valve to effect movement of the valve stem 21 toward valve closing position. One the other hand, it will readily be understood that when the rotor 50 is turned clockwise 90° the port 51 thereof will assume the position shown in dotted lines and interconnect the ports 39 and 49 to exhaust operating fluid from the pressure chamber 34 through the conduit 38 and 48 to the outlet side of the main valve 1 to permit opening of said main valve by line pressure acting on the disc 26.

As the main valve 1 closes, the inertia of the moving liquid will create a surge pressure of a magnitude depending upon the velocity and mass of the flowing liquid and the speed with which the valve 1 is closed to stop flow. It is the function of the valve 6 to prevent closing of the main valve under conditions that would create an excessive surge pressure on the upstream side of the main valve 1.

The valve 6 is shown in cross-section in Fig. 3 and comprises a valve body 55 having a threaded outlet opening 56 connected by a conventional fitting 57 with the outlet chamber 12 of the main valve 1. The body 55 also has a threaded inlet opening 58 in which a conventional fitting 59 is mounted to connect one end of a conduit 60 to the valve 6. The cover 15 has another boss 61 provided with a threaded opening 62 in which a conventional fitting 63 is mounted and connects the opposite end of the conduit 60 in communication with the pressure chamber 34 of the main valve 1.

A partition 64 in the valve body 55 separates the inlet and outlet openings 58 and 56, respectively, and serves as a support for an annular valve seat 65. The body 55 has a central opening 66 axially aligned with the seat 65. A generally spool-shaped intermediate valve section 67 is disposed above the valve body 55, and an annular gasket 68 is disposed between said valve section and body. A plurality of studs 69 is mounted in the body 55, and these extend through suitable openings in the gasket 68 and through a flange 70 in the lower end of the intermediate section 67. Nuts 71 are mounted on the studs 69 to secure the valve section 67, gasket 68 and valve body 55 together in leak-proof relation. The intermediate section 67 has a transverse wall 72 provided with an opening 73 in which a valve stem 74 is slidably mounted. The valve stem 74 has a recessed enlargement 75 at its lower end and carries a valve disc 76 adapted to engage the valve seat 65 to shut off flow through the valve 70.

The intermediate section 67 also has a flange 77 at its upper end. A flexible diaphragm 78 overlies the flange 77 and a cover 79 has a flange 80 engaged with the upper side of said diaphragm. A plurality of screws 81 secure the cover 79 and diaphragm 78 to the flange 77. The valve stem 74 has a shoulder 82 disposed above the transverse wall 72 adapted to form an abutment for a diaphragm supporting washer 83 at the lower side of the diaphragm 78. A similar washer 84 is mounted upon the stem 74 above the diaphragm 78 and is internally threaded so that it also serves as a clamping nut for securing the diaphragm 78 to the valve stem 74.

The cover 79 has a threaded boss 85 in which an adjusting screw 86 is mounted. A compression spring 87 is disposed within the cover 79 and its lower end is engaged with the washer 84 and its upper end is engaged with a disc 88 that bears against the inner end of the adjusting screw 86. A jam nut 89 locks the screw 86 in adjusted position.

The intermediate section 67 provides a pressure chamber 90 below the diaphragm 78, and a threaded opening 91 in a cylindrical wall of said section communicates with said pressure chamber. A conventional fitting 92 is mounted in the opening 91 and connects one end of a conduit 93 to the intermediate section 67. In Fig. 3, the fitting 92 is shown 90° out of phase with the location thereof indicated in Fig. 1, and this has been done solely in the interest of facilitating illustration. The opposite end of the conduit 93 is connected by a conventional fitting 94 with the pipeline 2 at a selected sensing point $x$ upstream of the main valve 1. An O-ring packing 95 is mounted in the transverse wall 72 and forms a seal around the valve stem 74 between the outlet chamber of the valve body 55 and the pressure chamber 90. The housing 79 has a vent opening 96 which exposes the upper side of the diaphragm 78 to atmospheric pressure.

It will be apparent from Figs. 1 and 3 that the pressure at the sensing point $x$ of the pipeline 2 will be communicated through the conduit 93 to the pressure chamber 90 of the valve 6. The screw 86 may be adjusted for any desired set pressure within the capacity of the valve 6, and is adjusted so that the spring 87 is set to provide a force that will permit opening of the valve 6 when the pressure at the sensing point $x$ reaches a given value, for example, a pressure 225 pounds per square inch. The stated pressure is arbitrary, and it will be understood that the valve 6 may bet set to open at any prescribed line pressure, depending upon the particular installation in which it is to be used.

By way of illustration, it may be assumed that under static conditions a pressure of 200 pounds per square inch is the maximum static pressure encountered in the pipeline 2. As the valve 1 is opened under the control of the pilot valve 5, that is, positioning the port 51 to interconnect ports 39 and 49, this static pressure will fall below 200 pounds per square inch due to the friction flow losses in the pipeline, and in any case will never normally rise above the 200 pounds per square inch static pressure. Assuming further that it is desired to stop such flow, the pilot valve 5 will be actuated to the position illustrated in full lines in Fig. 1 so that operating fluid will flow to the pressure chamber 34, in the manner previously described. As the main valve 1 closes, the pressure in the pipeline 2 will exceed the static pressure when the liquid mass and velocities are high enough and the main valve 1 is closed rapidly enough. However, with the valve 6 set to open at a pressure of 225 pounds per square inch, it will prevent the main valve 1 from closing rapidly enough to create a surge pressure in the pipeline 2 in excess of 225 pounds per square inch. Thus, it will be apparent that as soon as pressure conditions on the upstream side of the main valve 1 are such as to produce a pressure in the chamber 90 of the valve 3 sufficient to overcome the force of the closing spring 87, the disc 76 will be lifted from the seat 65 and operating fluid will be permitted to escape from the pressure chamber 34 of the main valve through the conduit 60. The flow capacity of the valve 6 is greater than that through the needle valve housing 41 so that when the valve 6 is open, it is impossible for operating fluid to flow into the pressure chamber 34 at a greater rate than it can be exhausted from said pressure chamber through the valve 6. Hence, the bleeding of the operating fluid from the pressure chamber 34 through the valve 6 will permit the main valve 1 to open under line pressure and thus prevent said main valve from creating a surge pressure in the line 2 in excess of 225 pounds per square inch. The valve 6 will permit the main valve 1 to remain open so long as the pressure at the sensing point x exceeds 225 pounds per square inch. However, when the upstream line pressure drops below this value, the valve 6 will automatically close and discontinue bleeding operating fluid from the pressure chamber 34 so that pressure can then build up therein and effect closing of the main valve 1, without creating a surge pressure in the pipeline 2 in excess of 225 pounds per square inch. Thus, the valve 6 directly controls the main valve 1 in accordance with surge pressure conditions in the pipeline 2, and makes it possible to close the valve 1 at a maximum safe rate so long as an excessive surge pressure is not created thereby in said pipeline.

It will be understood that the main valve 1 and the control valve 6 may be selected to handle any desired surge pressure conditions, and that the specific pressures mentioned herein are illustrative only and in no sense restrictive of the scope of the invention.

It will also be understood that various changes may be made in the details of construction and in the arrangement of the parts of the main valve 1 and the control valve 6, without departing from the principles of the invention or the scope of the annexed claims.

I claim:

1. Surge pressure control means, comprising: a fluid pressure operable main valve; control means connected with said main valve and normally operable to control the supply and exhaust of operating fluid to and from said main valve to control the closing and opening of said main valve; and means connected with said main valve and responsive to pressure conditions on the upstream side of said main valve operable to exhaust operating fluid from said main valve to control closing of said main valve independently of said first-mentioned control means.

2. Surge pressure control means, comprising: a fluid pressure operable main valve having a pressure chamber for operating fluid; means connected with said main valve normally operable to control the supply and exhaust of operating fluid to and from the pressure chamber of said main valve to control the closing and opening of said main valve; and a pressure-responsive control valve including an inlet, an outlet, a pressure chamber, and means operable by pressure in said chamber for controlling flow through said control valve; means connecting the inlet of said control valve with the pressure chamber of said main valve; means connecting the outlet of said control valve with the outlet of said main valve; and means connected with said pressure chamber of said control valve for effecting opening of said control valve to exhaust operating fluid from the pressure chamber of said main valve in response to a given pressure condition on the upstream side of said main valve.

3. Surge pressure control means, comprising: a fluid pressure operable main valve; control means connected with said main valve and normally operable to control the supply and exhaust of operating fluid to and from said main valve; a normally closed pressure-responsive control valve including an inlet, an outlet, a pressure chamber, means operable by pressure in said pressure chamber for controlling flow between said inlet and outlet of said control valve, and means for adjusting the pressure at which said control valve will open; means connecting the inlet of said control valve with said main valve to bleed operating fluid therefrom and means connecting the outlet of said control valve to a relatively low pressure zone; and means connecting the pressure chamber of said control valve with the upstream side of said main valve for effecting opening of said control valve in response to a given pressure condition on the upstream side of said main valve for controlling the closing of said main valve independently of said first-mentioned control means.

4. Surge pressure control means, comprising: a fluid pressure operable main valve including an inlet, an outlet, and a pressure chamber for operating fluid; a pilot valve connected with said main valve normally operable to control the supply and exhaust of operating fluid to and from the pressure chamber of said main valve to control the closing and opening of said main valve; a normally closed pressure-responsive valve having an inlet and an outlet; means connecting the inlet of said pressure-responsive valve with the pressure chamber of said main valve; means connecting the outlet of said pressure-responsive valve with the outlet of said main valve, said pressure-responsive valve having means including a diaphragm for controlling flow therethrough and a pressure chamber associated with said diaphragm; and means connecting the pressure chamber of said pressure-responsive valve with the upstream side of said main valve for effecting opening of said main valve in response to a given pressure condition on the upstream side of said main valve.

5. In combination, a pipeline having a pressure-responsive main valve connected therein for controlling the flow of liquid therethrough; pilot valve means connected with said main valve and normally operable to control the supply and exhaust of operating fluid to and from said main valve; and a normally closed pressure-responsive auxiliary control valve connected with said main valve and including means adjustable to respond to a set pressure condition at a selected pressure sensing point along said pipeline on the upstream side of said main valve for effecting opening of said control valve to exhaust operating fluid from said main valve should the pressure at said sensing point exceed the setting of said control valve.

6. In combination, a pipeline having a fluid pressure operable main valve connected therein for controlling the flow of liquid therethrough; means operatively connected with said main valve and normally operable to control the supply and exhaust of operating fluid to and from said main valve to control the closing and opening of said main valve; and a normally closed pressure-responsive control valve for controlling said main valve to prevent the creation of excessive surge pressure in said pipeline on the upstream side of said main valve, said control valve having an inlet and means connecting said inlet with said main valve for bleeding operating fluid therefrom and having an outlet and means connecting said outlet with a zone of relatively low pressure, said control valve also having a pressure chamber and an element operable in response to a predetermined pressure in said pressure chamber for effecting opening of said control valve; and means connecting the pressure chamber of said control valve with said pipeline at a selected pressure sensing point along said pipeline on the upstream side of said main valve.

References Cited in the file of this patent

UNITED STATES PATENTS

| | | |
|---|---|---|
| 1,664,493 | Smith | Apr. 3, 1928 |
| 2,007,554 | Westerberg | July 9, 1935 |
| 2,421,325 | Griswold | May 27, 1947 |
| 2,543,846 | Griswold | Mar. 6, 1951 |
| 2,577,967 | Hughes | Dec. 11, 1951 |

FOREIGN PATENTS

| | | |
|---|---|---|
| 200,613 | Great Britain | July 19, 1923 |
| 400,092 | Great Britain | Oct. 19, 1933 |